United States Patent
Costello et al.

(10) Patent No.: US 10,262,312 B2
(45) Date of Patent: Apr. 16, 2019

(54) POINT-OF-SALE TERMINAL AND METHOD OF OPERATING SAME

(71) Applicant: NCR Corporation, Duluth, GA (US)

(72) Inventors: Christopher John Costello, Suwanee, GA (US); Yoshitaka Utsumi, Kanagawa (JP)

(73) Assignee: NCR Corporation, Atlanta, GA (US)

( * ) Notice: Subject to any disclaimer, the term of this patent is extended or adjusted under 35 U.S.C. 154(b) by 171 days.

(21) Appl. No.: 14/744,365

(22) Filed: Jun. 19, 2015

(65) Prior Publication Data

US 2016/0371669 A1 Dec. 22, 2016

(51) Int. Cl.
| | |
|---|---|
| G06Q 20/00 | (2012.01) |
| G06K 7/10 | (2006.01) |
| G06Q 20/20 | (2012.01) |
| G07G 1/00 | (2006.01) |

(52) U.S. Cl.
CPC ......... G06Q 20/208 (2013.01); G07G 1/0045 (2013.01)

(58) Field of Classification Search
CPC .................. G06Q 20/201; G06Q 20/4016
See application file for complete search history.

(56) References Cited

U.S. PATENT DOCUMENTS

| | | | | |
|---|---|---|---|---|
| 5,478,990 A * | 12/1995 | Montanari | ........... | A22B 5/0064 235/375 |
| 8,117,071 B1 * | 2/2012 | Fitch | ........... | G06Q 20/201 235/462.01 |
| 9,311,645 B2 * | 4/2016 | Edwards | ........... | G06Q 20/4016 |
| 9,569,765 B2 * | 2/2017 | Cancro | ........... | G06Q 20/208 |
| 2005/0199723 A1 * | 9/2005 | Lubow | ........... | G06K 1/18 235/462.01 |
| 2013/0277425 A1 * | 10/2013 | Sharma | ........... | B65D 90/00 235/376 |
| 2013/0290902 A1 * | 10/2013 | Martin | ........... | D06F 39/005 715/823 |
| 2014/0063262 A1 * | 3/2014 | Edwards | ........... | G06Q 20/4016 348/159 |
| 2014/0122261 A1 * | 5/2014 | Jung | ........... | G06Q 50/12 705/15 |
| 2014/0122262 A1 * | 5/2014 | Jung | ........... | G06Q 50/12 705/15 |
| 2014/0122519 A1 * | 5/2014 | Jung | ........... | G06Q 10/00 707/769 |
| 2014/0122520 A1 * | 5/2014 | Jung | ........... | G06Q 30/0623 707/769 |
| 2015/0345068 A1 * | 12/2015 | Coffman | ........... | D06F 58/28 715/771 |
| 2016/0063755 A1 * | 3/2016 | Cancro | ........... | G06Q 20/208 345/424 |
| 2016/0171473 A1 * | 6/2016 | Pugh | ........... | G06O 20/208 705/23 |

* cited by examiner

*Primary Examiner* — Talia F Crawley
(74) *Attorney, Agent, or Firm* — Schwegman, Lundberg & Woessner

(57) ABSTRACT

Embodiments of a symbol for identification of a property of a presented item at a Point-Of-Sale Terminal (POS) are generally described herein. A method can include a detecting a presence of a symbol other than a barcode within at least one image captured by a scanner of the POS of an item presented to the scanner, the symbol indicating that the presented item has a property, and when the presence of the symbol is detected, outputting an indication that the presented item has the property.

10 Claims, 5 Drawing Sheets

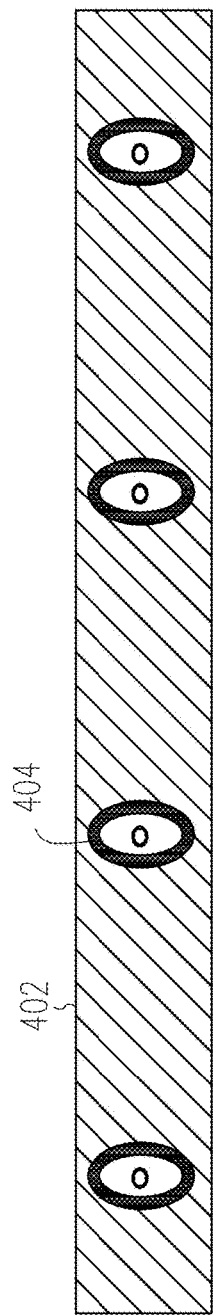
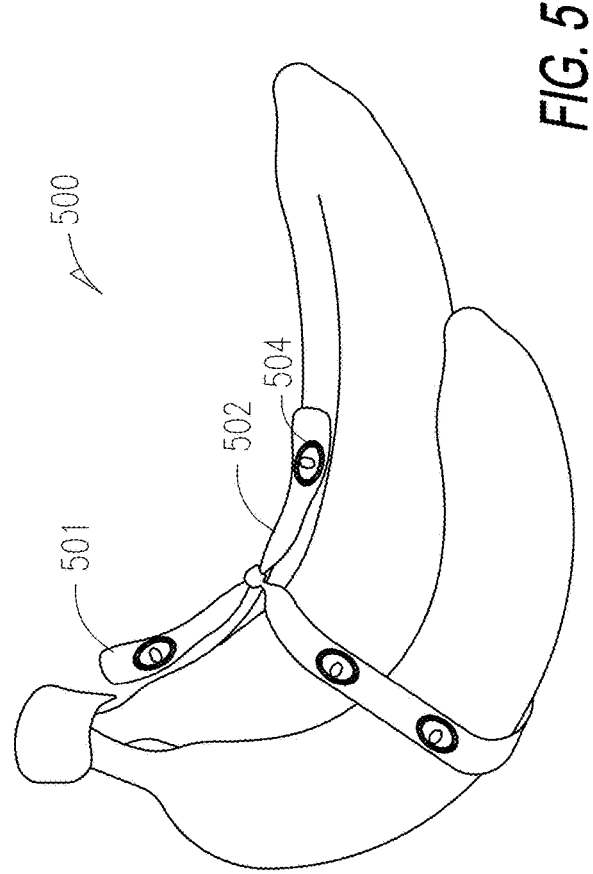

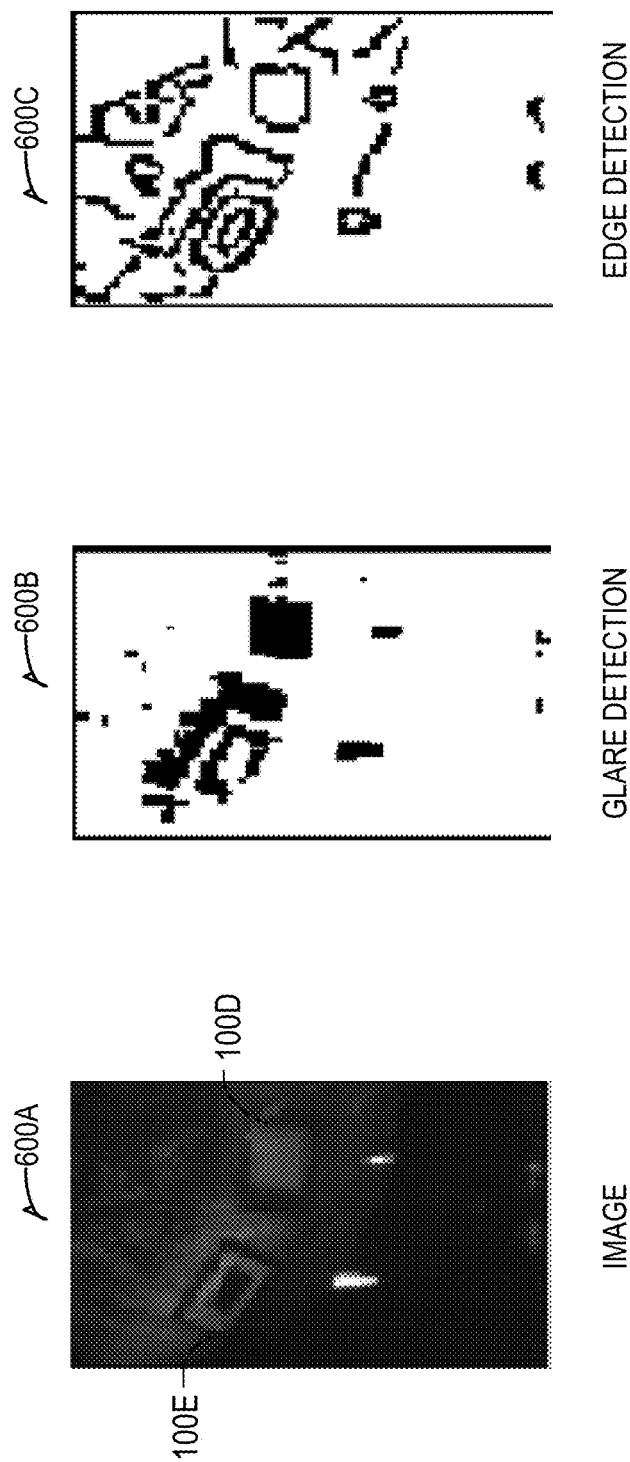

POINT-OF-SALE TERMINAL AND METHOD OF OPERATING SAME

BACKGROUND

Stores equipped with Point-Of-Sale Terminals (POS), such as Self-Service Terminals (SSTs) or cashier-assisted terminals, that sell products, often sell products that have a similar appearance, but are priced differently. Organic produce items are one such example. In organic produce situations, stores selling organic produce lose money when consumers pay a non-organic price for the organic produce. When purchasing organic produce, a consumer or cashier typically places the organic produce on a scale or in view of a scanner or camera of a POS. An option on a display of the POS that should match the organic produce is then selected. In current systems, finding the organic produce on the display can be difficult and an improper selection can be erroneously or intentionally selected.

Currently, different produce items use different ways to indicate that the produce is organic. The varying features are often not detectable by a scanner of a POS in real time. The lack of consistency in labeling produce also causes difficulties in identifying whether the produce is organic. Another issue in identifying organic produce arises when produce is bagged.

SUMMARY

In various embodiments, methods and systems for item property identification using a symbol at a Point-Of-Sale Terminal (POS) are presented.

According to an embodiment, a method can include a detecting a presence of a symbol other than a barcode within at least one image captured by a scanner of a Point-Of-Sale Terminal (POS) of an item presented to the scanner, the symbol indicating that the presented item has a property, and when the presence of the symbol is detected, outputting an indication that the presented item has the property.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 4 is a diagram of a label including a plurality of symbols according to an example embodiment.

FIG. 5 is a diagram of a label band wrapped around organic produce according to an example embodiment.

FIGS. 6A-6C are diagrams of images used to determine if a symbol is present indicating an item has a property according to an example embodiment.

DETAILED DESCRIPTION

The following detailed description of the present subject matter refers to subject matter in the accompanying drawings which show, by way of illustration, specific aspects and embodiments in which the present subject matter can be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

As described above, a significant amount of income can be lost by stores when selling similar looking products that are priced differently. For example, when consumers pay non-organic prices for organic produce because organic produce typically costs more than non-organic produce. Currently, different produce items use different symbols to indicate that produce is organic for the benefit of consumers. These different symbols, however, are not readable by a scanner in real time. The various symbols currently used are also not readable when they are on produce that is bagged.

In an example, scanner-readable symbols can be used to denote product properties, such as a symbol for produce that represents that the produce is organic. The symbol can be detectable by a scanner in real time, for example by a scanner of a Point-of-Sale Terminal (POS), such as a Self-Service Terminal (SST). In an example, the symbol can be detected when an item, such as produce is bagged.

A symbol can be used to identify one or more properties of an item, such as identifying an item as organic produce, independently of manufacture symbols or labels, type of the item, such as a produce-type, or store selling the item. The symbol can be configured from a set of specifications. In an example, a first symbol can differ from a second symbol while both conform to the set of specifications. For example, the first symbol can include a first set of colors or shapes and the second symbol can include a second set of colors or shapes, such as by using one set for fruits and another set for vegetables, or the like. In another example, the set of specifications can include properties such as requiring a geometric shape or a combination of geometric shapes (e.g., a circle, oval, rectangle, star, etc.). Another property can include a high contrast between a first portion and a second portion of the symbol.

Figure 1A:
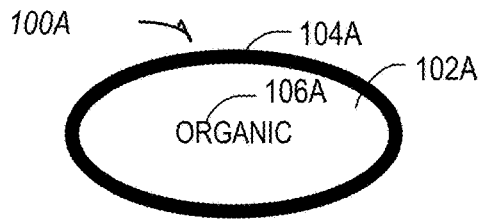
FIGS. 1A-1E are diagrams of labels including symbols according to an example embodiment.

FIGS. 1A-1E are diagrams of labels including symbols according to an example embodiment. FIG. 1A is an example label 100A including a symbol taking up the entire first side of the label 100A. The symbol includes a first feature 102A that in the example shown is white and a second feature 104A that in the example shown is black. Other colors and patterns can be used for the first feature 102A and the second feature 104A. In an example, any contrasting colors or patters can be used for the first feature 102A and the second feature 104A. For example, in FIG. 1E, the first portion 102E is black and the second portion 104E is white of label 100E. Other examples can include combinations of colors with high contrast, such as yellow and purple, red and green, orange and blue, etc., or combinations of patterns such as dots and dashes, opposite direction lines, triangles and circles or other shapes, etc.

Figure 1B:
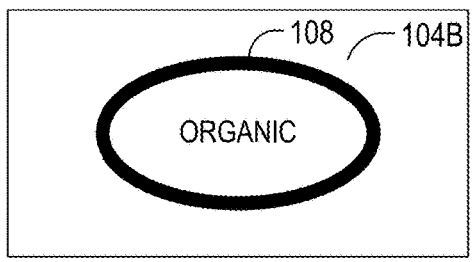
Figure 1C:
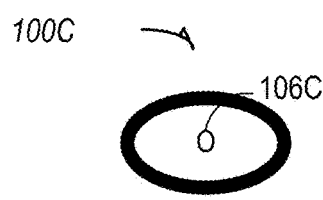
Figure 1D:
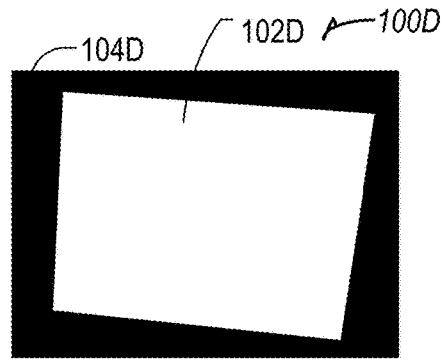
Figure 1E:
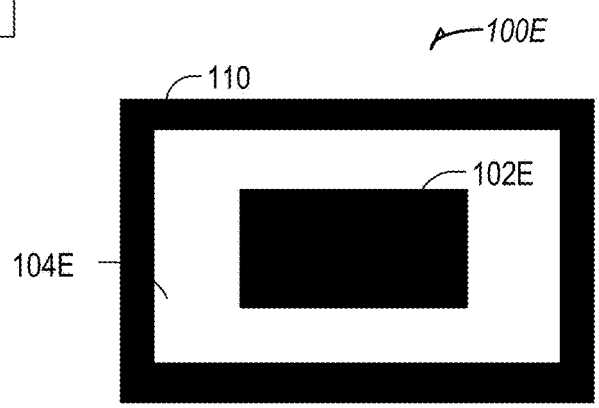

The second feature 104A can include a boundary around the first feature 102A. In the example of label 100A, the second feature 104A is the boundary around the first feature 102A. Similarly, FIG. 1D shows a symbol with a first portion 102D and a second portion 104D wherein the second portion 104D is a boundary around the first portion 102D. In another example, FIG. 1B shows a label 100B including a symbol with a second feature 104B that includes a boundary 108 that is part of the second feature 104B but not all of the second feature 104B. In yet another example, FIG. 1E shows a symbol with a first portion 102E and a second portion 104E, wherein the second portion 104E includes a boundary in white around the first portion 102E. The second portion 104E also can include a second boundary 110 around the white boundary around the first portion 102E.

The label 100A of FIG. 1A includes an identifying mark 106A. In the example shown in label 100A, the identifying mark 106A says "organic." In the example shown in FIG. 1C, a label 100C includes an identifying mark 106C that says "O." Other examples, including non-text identifying marks, can be used.

In an example, a label can include a symbol with non-parallel lines. For example, FIG. 1D includes a label 100D with a first portion 102D and a second portion 104D, wherein the boundary of the first portion 102D includes lines that are not parallel to the boundary of the second portion 104D. In another example, the boundary of the first portion 102D can include lines that are not parallel to each other. The symbol on the label 100D can include other shapes for the first portion 102D or the second portion 104D, including a circle, a triangle, a star, a rectangle, a rhombus, etc. Different combinations can be used of the above shapes for different portions of the symbol.

The various example labels 100A-100E can include an adhesive on a back side, opposite a side with a symbol, and the adhesive can be used to affix the various example labels 100A-100E to items, such as organic produce. In an example, the adhesive can include a food-safe adhesive so that the label can adhere directly to produce. In another example, the label can adhere to packaging of an item using the adhesive. In yet another example, a label can be affixed to an item using other techniques.

The various example labels 100A-100E can include a non-reflective material or a reflective material. The reflective material can include a highly scattered specular reflection, such as a retroreflective sticker. In an example, a label can include a symbol with reflective material and the label can be affixed to packaging or an item, such as organic produce. The reflective material can be configured to have a high contrast with the packaging or the item. In another example, a label can include a symbol that includes reflective and non-reflective material, for example reflective material in a first feature and non-reflective material in a second feature. In an example, an oval label can be a few inches in circumference, such as with a major axis of an inch and a half and a minor axis of a half an inch to three-fourths of an inch.

Figure 2:
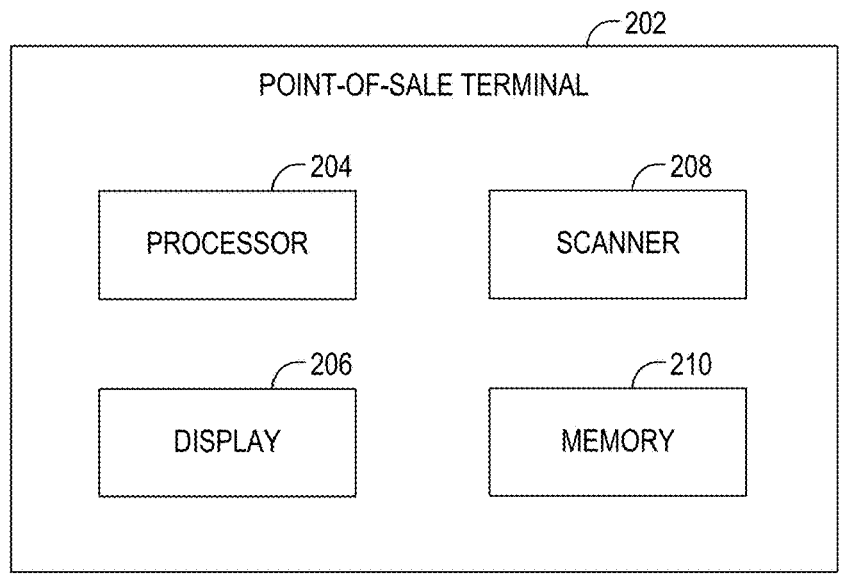
FIG. 2 is a diagram of a Point-Of-Sale Terminal (POS) according to an example embodiment.

FIG. 2 is a diagram of a Point-of-Sale Terminal (POS) 202 according to an example embodiment. The POS can include a processor 204, a display 206, a scanner 208, and memory 210. In an example, the display 206 can include a user interface and a touchscreen. The display 206 can be configured to display a user selectable option, such as an option for an item (e.g., produce or organic produce). In an example, the scanner 208 can be used to scan presented item and obtain at least one image of a presented item. The processor 204 can be configured to determine, from the scan, a symbol on the presented item, and the symbol can indicate that the item has a property, such as being an item of organic produce. In another example, the scanner 208 can include a processor in the scanner 208 and can perform the techniques described herein without using other aspects of the POS. The display 206 can be configured to display at least one user selectable option in response to detecting a symbol. The at least one user selectable option can include being limited to a set of options corresponding to a property of a presented item as indicated by the symbol. In another example, the display 206 can show both items corresponding to the property and items not corresponding to the property, (e.g., organic and non-organic produce user selectable options). In yet another example, the display 206 can show both items corresponding to the property and items not corresponding to the property while altering one or both of the types of options, such as by dimming the items not corresponding to the property, highlighting the items corresponding to the property, or the like. The memory 210 can be used to store instructions to implement techniques described herein.

In an example, the scanner 208 can include a camera. The scanner 208 can include one or more devices to capture light information. In an example, a consumer can place a presented item on the POS, such as on a scale of the POS. The scale can be included with the scanner 208. In an example, the scanner 208 can scan the presented item when it is placed on the scale. The scanner 208 can include a plurality of capture devices to increase the likelihood that a symbol, if it is affixed to the presented item, will be captured. When the scanner 208 captures an image of the presented item, the processor 204 can determine if the presented item includes a symbol indicating a property of the presented item, such as that the presented item includes organic produce. If the processor 204 detects a symbol on the presented item, the POS can require a user selection of an item corresponding to the property of the presented item, such as an organic produce item selection.

In an example, the POS can be programmed to run quicker when determining whether an item has a property using a symbol than without the use of a symbol. When the POS looks for a single symbol instead of trying to decipher multiple symbols, the processing power and cycles needed to process the information are lowered and the results can be obtained quicker. This improves the functioning of the POS by freeing up processing power and lowering energy use.

Figure 3:
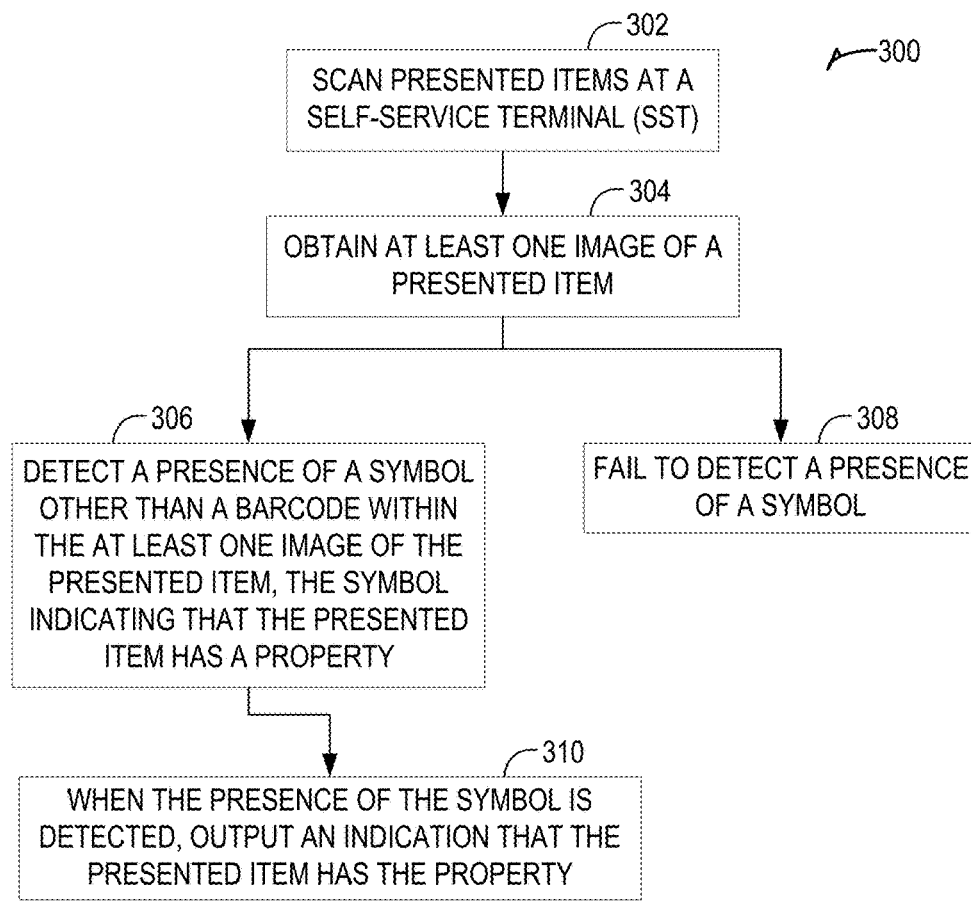
FIG. 3 is a flowchart showing a technique for detecting a symbol on a label indicating organic produce according to an example embodiment.

FIG. 3 is a flowchart showing a technique 300 for detecting a symbol on a label indicating an item has a property according to an example embodiment. The technique 300 can include an operation 302 to scan presented items at a scanner of a POS.

The technique 300 can include an operation 304 to obtain at least one image of a presented item using the scanner. The technique 300 can include an operation 306 to detect a presence of a symbol other than a barcode within the at least one image of the presented item, the symbol indicating that the presented item has a property. The property can indicate the presented item is an item of organic produce. The technique 300 can include an operation 308 to fail to detect a presence of a symbol, such as when the presented item is not organic produce. The symbol can include a predetermined shape, such as a marked boundary surrounding an oval. The oval and the marked boundary can be in high contrast. High contrast can include black and white or other types of contrast as described above.

The technique 300 can include an operation 310 to, when the presence of the symbol is detected, output an indication that the presented item has the property. For example, the technique can include displaying at a display of the POS, at least one user selectable option in response to detecting the symbol. The at least one user selectable option identified can be limited to a set of options corresponding to the property indicated by the detected presence of the symbol. The property can indicate that the presented item is organic produce, is time-sensitive or date-sensitive, is a limited quantity item, etc. In another example, the technique 300 can include detecting the symbol by detecting edges of the first feature, wherein the first feature includes an oval shape. For example, the technique 300 can include detecting the contrast difference between the first feature and the boundary, and determining information about the shape of the first feature using the contrast difference. The technique 300 can further include determining a ratio of a major axis to a minor axis of the detected edges of the oval shape and comparing the ratio to a predetermined ratio. For example, the ratio may include a major axis twice the length of a minor axis. In another example, the technique can include detecting the symbol by comparing information about the detected edges of the first feature to information about a stored ellipse and determining if the comparison exceeds a threshold. For example, determining if a best fit analysis between the detected edges of the first feature and the stored ellipse exceeds the threshold (e.g., ellipse fitting).

FIG. 4 is a diagram of a label 400 including a plurality of symbols (e.g., 404) according to an example embodiment. The label 400 includes a band 402 and a plurality of symbols (e.g., 404). In an example, the band can be used to wrap produce, such as a bunch of bananas, bunch of asparagus, bunch of carrots, etc. In another example, the band can be used to wrap packaging containing organic produce or adhere to packaging or organic produce itself.

In an example, the label 400 can include a symbol 404 or a plurality of symbols. The band 402 and the symbol 404 can be differentiated by color or pattern. For example, the symbol 404 can include a first feature and a second feature (including a boundary around the first feature) as described above and the band 402 can include a color or pattern different from the boundary or second feature. In the example label 400, the band 402 includes a pattern and the symbol 404 includes solid colors in the first feature and second feature, and an identifying mark in the middle of the first feature. Other example labels can include a label with patterns and a band with a solid color, both label and band with solid colors, or both label and band with patterns. In yet another example, the band 402 can be translucent or transparent. In another example, the symbol can include features that are translucent or transparent. The label 400 can include an adhesive or an adhesive layer on a side of the band 402 opposite a side including the symbol 404.

FIG. 5 is a diagram 500 of a label 501 wrapped around an item according to an example embodiment. In the example diagram 500 shown in FIG. 5, a bunch of bananas is wrapped by a label 501. The label 501 includes a band 502 and a symbol 504. The label 501 can include a plurality of labels (e.g., 504). The label 501 can include features described above for the label 400 of FIG. 4. In an example, the label 501 can be configured to secure to itself when twisted, such as using a wire. In another example, the label 501 can be configured to allow for a knot to be tied in the label 501. The label 501 can include a symbol 504 on a first side and a second symbol on a second side, the second side opposite the first side. A plurality of symbols on one or more sides of the band 502 can be included on the label 501 so that one or more symbols are visible in all configurations of twisting, tying, wrapping, or the like.

FIGS. 6A-6C are diagrams of images used to determine if a symbol is present indicating an item has a property according to an example embodiment. FIG. 6A includes a symbol 600A of an item including two example symbols. For example, FIG. 6A includes the image 600A of label 100E and label 100D of FIG. 1. In an example, the image 600A can be captured by a scanner of a POS. For example, image 600A can be a grayscale image. The image 600A can be processed for glare detection, resulting in image 600B of FIG. 6B or for edge detection, resulting in image 600C of FIG. 6C. Image 600B includes glare detected from parts of a plastic bag visible in image 600A that is holding items, such as organic produce (including label 100D and label 100E) and glare detected from the symbols on labels 100D and 100E. Similarly, the edge detection in image 600C shows edges of the plastic bag and the symbols on labels 100D and 100E. Other image processing techniques can be used to determine that a symbol on a label is included in an image of produce. In an example, the edge detection in image 600C can include a brightness histogram.

Figure 7:
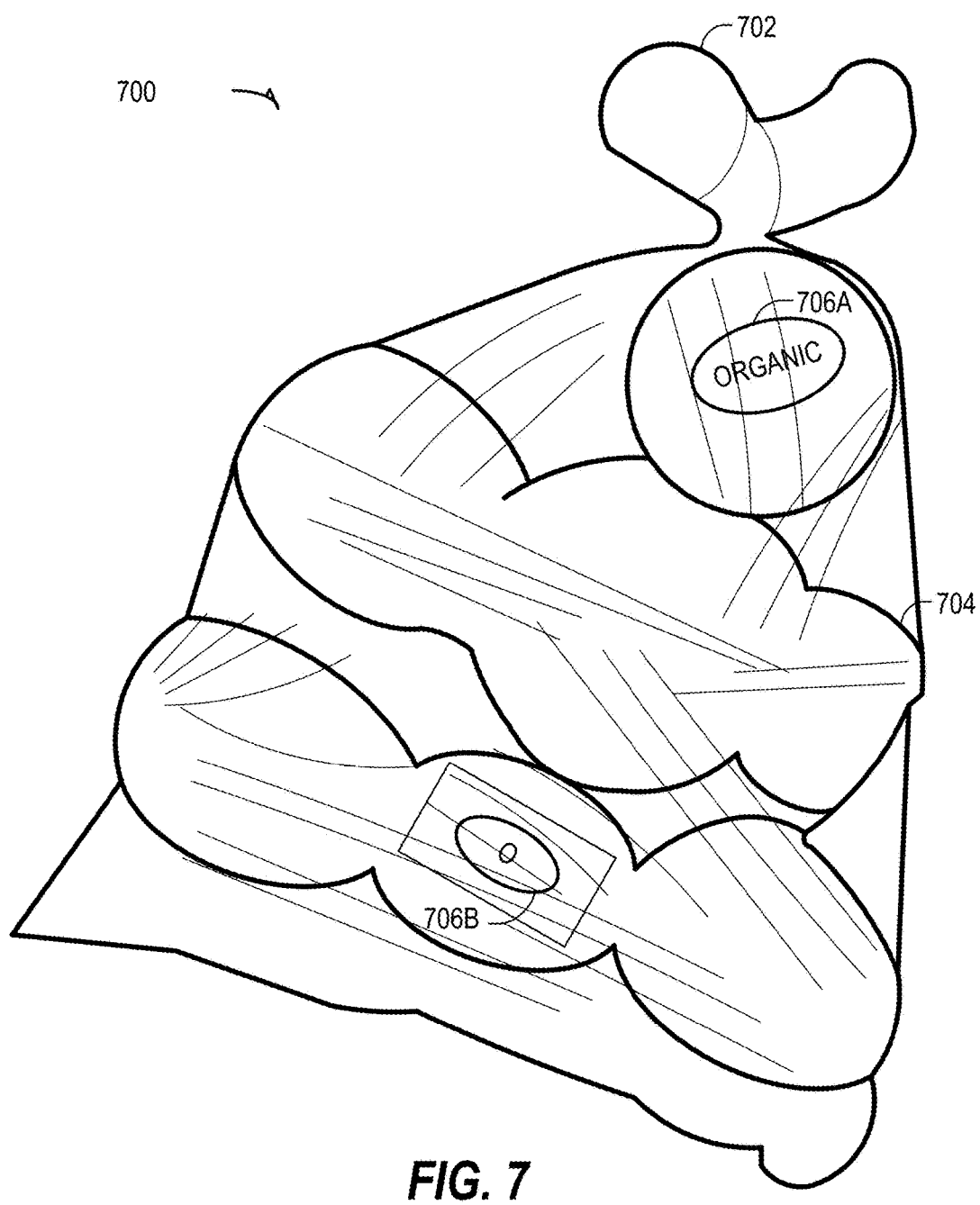
FIG. 7 is a diagram of a bag enclosing produce according to an example embodiment.

FIG. 7 is a diagram 700 of a bag 702 enclosing produce according to an example embodiment. The diagram 700 includes a bag 702, produce 704 and an example label (e.g., 706A or 706B). The labels 706A and 706B can be configured to be read by a processor of a POS after being captured in an image by the POS. The symbols on the labels 706A and 706B can include high contrast features such that the features are readable by the POS through the bag 702. The bag 702 can include a plastic bag, such as a typical produce bag, or other translucent or transparent bag. In an example, the bag 702 can be placed on a POS and a scanner of the POS can capture an image of the produce 704 in the bag 702, such as the image 600A of FIG. 6A. The POS can determine from the image that the item has a property by detecting a symbol. In another example, the POS can detect a plurality of symbols corresponding to a plurality of items. In yet another example, the POS can begin to determine whether a captured image includes a symbol and stop if a symbol is found. If a symbol is not detected, the POS can determine that the item does not have the property. In an example, the POS can detect a symbol that is partially enclosed within the bag 702. In the example shown in FIG. 7, the bag 702 is tied, but need not be. If the bag 702 is not tied, a symbol can be partially inside the bag 702 and partially outside the bag 702, and the POS can detect the symbol.

In an example, a symbol can be applied to special discounts, membership discounts or identification, or other applications. In an example, a POS can include a kiosk (e.g., a vending machine, etc.). In an example, a POS can include a SST device. In an example, an POS can include a payment facilitating machine (e.g., a tablet with a card reader, etc.).

VARIOUS NOTES & EXAMPLES

Each of these non-limiting examples can stand on its own, or can be combined in various permutations or combinations with one or more of the other examples.

Example 1 includes the subject matter embodied by a method comprising: detecting a presence of a symbol other than a barcode within at least one image captured by a scanner of a Point-Of-Sale Terminal (POS) of an item presented to the scanner, the symbol indicating that the presented item has a property, and when the presence of the symbol is detected, outputting an indication that the presented item has the property.

In Example 2, the subject matter of Example 1 can optionally include wherein the method is performed by the scanner and outputs the indication to another computing device of the POS.

In Example 3, the subject matter of one or any combination of Examples 1-2 can optionally include further comprising displaying at least one user selectable option on a display of the POS in response to detecting the symbol.

In Example 4, the subject matter of one or any combination of Examples 1-3 can optionally include wherein the at least one user selectable option is a limited set of options corresponding to the property indicated by the detected presence of the symbol.

In Example 5, the subject matter of one or any combination of Examples 1-4 can optionally include wherein the property indicates the presented item is an item of organic produce.

In Example 6, the subject matter of one or any combination of Examples 1-5 can optionally include wherein the symbol includes a predefined shape.

Example 7 includes the subject matter embodied by a Point-Of-Sale Terminal (POS) comprising: a scanner configured to: scan presented items, obtain at least one image of a presented item, a processor configured to: detect a presence of a symbol other than a barcode within the at least one image of the presented item, the symbol indicating that the presented item has a property, and when the presence of the symbol is detected, output an indication that the presented item has the property.

In Example 8, the subject matter of Example 7 can optionally include wherein the processor is configured to display at least one user selectable option on a display of the POS in response to detecting the symbol.

In Example 9, the subject matter of one or any combination of Examples 7-8 can optionally include wherein the at least one user selectable option is a limited set of options corresponding to the property indicated by the detected presence of the symbol.

In Example 10, the subject matter of one or any combination of Examples 7-9 can optionally include wherein the property indicates the presented item is an item of organic produce.

In Example 11, the subject matter of one or any combination of Examples 7-10 can optionally include wherein the symbol includes a predefined shape.

In Example 12, the subject matter of one or any combination of Examples 7-11 can optionally include wherein the symbol includes or is printed upon a reflective surface of a reflective material.

In Example 13, the subject matter of one or any combination of Examples 7-12 can optionally include wherein the presence of the symbol is detected in part by the processor applying an detection algorithm against the at least one image.

Example 14 includes the subject matter embodied by a method for determining whether a presented item has a property, the method comprising: scanning a presented item at a scanner of a Point-Of-Sale Terminal (POS), obtaining at least one image of the presented item, detecting a presence of a symbol other than a barcode within the at least one image of the presented item, the symbol indicating that the presented item has a property, and when the presence of the symbol is detected, outputting an indication that the presented item has the property.

In Example 15, the subject matter of Example 14 can optionally include further comprising displaying at least one user selectable option on a display of the POS in response to detecting the symbol.

In Example 16, the subject matter of one or any combination of Examples 14-15 can optionally include wherein the at least one user selectable option is limited to at least one option corresponding to the property indicated by the detected presence of the symbol.

In Example 17, the subject matter of one or any combination of Examples 14-16 can optionally include wherein the property indicates the presented item is an item of organic produce.

In Example 18, the subject matter of one or any combination of Examples 14-17 can optionally include wherein the symbol includes a predefined shape.

In Example 19, the subject matter of one or any combination of Examples 14-18 can optionally include wherein the symbol includes a reflective material.

In Example 20, the subject matter of one or any combination of Examples 14-19 can optionally include wherein detecting the presence of the symbol includes detecting the presence of the symbol using edge detection on the at least one image.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method for operating a point-of-sale terminal, the method comprising:
    capturing, with a camera of the point-of-sale terminal, at least one image of an item presented to the camera;
    applying edge detection, with a processor of the point-of-sale terminal, to the at least one image to detect a presence of a predefined shape within the at least one image, the predefined shape indicating that the presented item has a property; and
    displaying, on a display operatively coupled to the processor of the point-of-sale terminal, at least one user selectable option corresponding to the presented item and at least one non-selectable option corresponding to a corresponding item that lacks the property, the at least one non-selectable option being dimmed on the display compared with the at least one selectable option.

2. The method of claim 1, wherein the at least one user selectable option is a limited set of options corresponding to the property.

3. A point-of-sale terminal; comprising:
    a camera configured to scan presented items and obtain at least one image of a presented item;
    a processor configured to apply edge detection to the at least one image to detect a presence of a predefined shape other than a barcode within the at least one image, the predefined shape indicating that the presented item has a property; and a display operatively coupled to the processor and configured to display at least one user selectable option corresponding to the presented item and at least one non-selectable option corresponding to a corresponding item that lacks the property, the at least one non-selectable option being dimmed on the display compared with the at least one selectable option.

4. The point-of-sale terminal of claim 3, wherein the at least one user selectable option is a limited set of options corresponding to the property.

5. The point-of-sale terminal of claim 3, wherein the non-text symbol includes or is printed upon a reflective surface of a reflective material on the item.

6. A method for operating a point-of-sale terminal, the method comprising:

capturing, with a camera of the point-of-sale terminal, at least one image of an item presented to the camera;

applying edge detection, with a processor of the point-of-sale terminal, to the at least one image to detect a presence of a predefined shape other than a barcode within the at least one image, the predefined shape indicating that the presented item has a property; and displaying, on a display operatively coupled to the processor of the point-of-sale terminal, at least one user selectable option corresponding to the presented item and at least one non-selectable option corresponding to a corresponding item that lacks the property, the at least one non-selectable option being dimmed on the display compared with the at least one selectable option.

7. The method of claim 6, wherein the predefined shape is positioned on a reflective material on the item.

8. The method of claim 1, wherein the property indicates that the presented item is an item of organic produce.

9. The point-of-sale terminal of claim 3, wherein the property indicates that the presented item is an item of organic produce.

10. The method of claim 6, wherein the property indicates that the presented item is an item of organic produce.

* * * * *